United States Patent [19]

Bourrieres

[11] 3,958,784

[45] May 25, 1976

[54] RETAINING DEVICE FOR AN ELECTRIC CABLE

[75] Inventor: Pierre Bourrieres, Cahors, France

[73] Assignee: Manufacture d'Appareillage Electrique de Cahors, Cahors, France

[22] Filed: Jan. 21, 1975

[21] Appl. No.: 543,830

[30] Foreign Application Priority Data
Feb. 5, 1974 France .............................. 74.03791

[52] U.S. Cl. .............................. 248/63; 24/132 AB; 24/132 AC; 174/168; 248/58; 248/303
[51] Int. Cl.² ............................................ F16L 3/00
[58] Field of Search ............... 248/63, 58, 64, 303, 248/340; 174/40 R, 168; 24/115 G, 132 AA, 132 AB, 132 AC, 249 SA; 339/105

[56] References Cited
UNITED STATES PATENTS

| 862,082 | 7/1907 | Lewis .............................. 248/63 X |
| 1,272,944 | 7/1918 | Green .............................. 24/132 AB |
| 1,898,677 | 2/1933 | Malone .......................... 24/132 AB X |
| 2,557,877 | 6/1951 | Kluson .......................... 24/132 AC |
| 3,239,173 | 3/1966 | Watkins .............................. 248/63 |

FOREIGN PATENTS OR APPLICATIONS

| 1,205,896 | 11/1965 | Germany ...................... 24/132 AC |
| 518,011 | 1/1931 | Germany .............................. 248/63 |
| 55,811 | 2/1922 | Sweden .............................. 248/63 |
| 1,209,452 | 10/1970 | United Kingdom ................ 339/105 |
| 285,706 | 7/1914 | Germany .............................. 174/168 |
| 9,734 | 9/1912 | United Kingdom ................ 174/168 |

*Primary Examiner*—Roy D. Frazier
*Assistant Examiner*—Rodney H. Bonck
*Attorney, Agent, or Firm*—Young & Thompson

[57] ABSTRACT

A cable-retaining device attached by hooking to a support mounted on a pole comprises a suspension body and a guiding member rotatably mounted within the body and associated with a suspension hook. A passageway formed in the guiding member is located in the line of extension of two outer passageways formed in the suspension body in a cable-displacement position and is angularly displaced with respect to the body passageways in a cable-retaining position.

5 Claims, 9 Drawing Figures

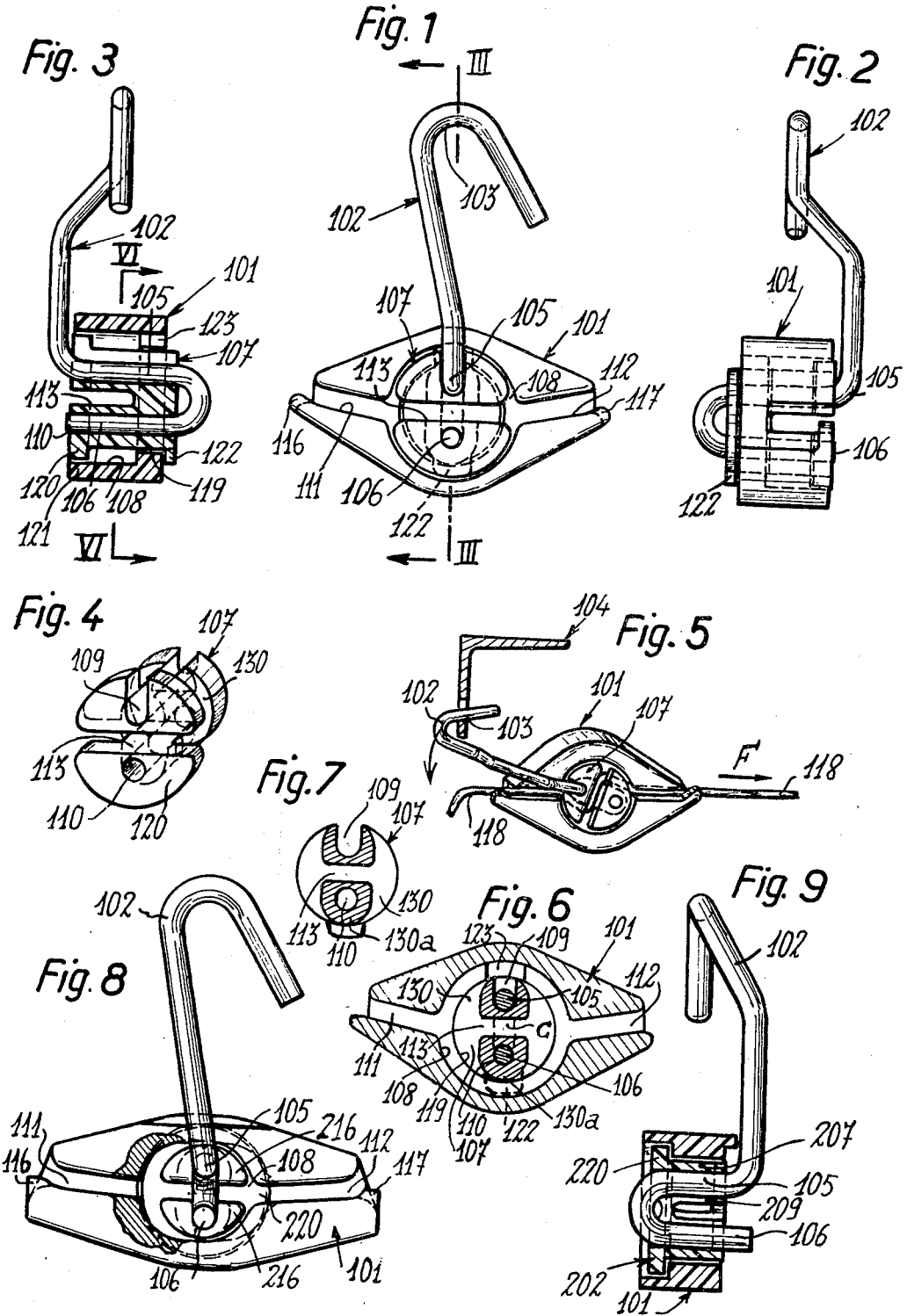

RETAINING DEVICE FOR AN ELECTRIC CABLE

This invention relates to a retaining device for providing a connection between an electric cable and a fixed support such as a right-angled bracket mounted on a pole, said retaining device being so arranged as to permit attachment by hooking to said support.

In the present invention, electric cables are understood to mean wires which carry current at low voltage or telephone wires, with the exception of high or medium-voltage conductors.

There are a number of known retaining systems for providing a connection between an electric cable and a fixed support in which the connection has for its object:
- either to permit the free displacement of the cable,
- or to permit anchoring of the cable, in particular for retaining it in the event of occurrence of a break between the support and an adjacent support.

In a first known system, the connection with the support is established by means of a metal hook suspended from said support. This system is subject to a disadvantage in that a metallic contact exists between the cable, the hook, and the support.

A second system for passing cables which is intended to remove the disadvantage of the metallic contact consists of a rubber or plastic stirrup-piece commonly known as a saddle in which the cable is engaged. This stirrup-piece is in turn attached to the support by means of a metal suspension hook.

This system and generally speaking all the other known systems suffer from a disadvantage, however, in that the cable is no longer retained if a break occurs in this latter on either side of the support.

The aim of the invention is to overcome the drawbacks mentioned in the foregoing by making it possible to construct a retaining device for attaching the cable to a support without any metallic contact, by ensuring either displacement or anchoring of the cable, and also by ensuring that said cable is held in position in the device by clamping in the event of occurrence of a break in the cable on either side of the support.

The invention is directed to a retaining device for an electric cable, comprising a body having two passageways in opposite relation for the cable; this device comprises a suspension hook for the articulated attachment of the device to a fixed support, and a cable guiding member which is capable of moving with respect to the body between a position of free displacement of the cable and a position of clamping of the cable.

In accordance with the invention, the device aforesaid is distinguished by the fact that the guiding member comprises a sleeve associated with the suspension hook and provided with a passageway for the cable; the sleeve aforesaid is capable of rotating about an axis located transversely with respect to the sleeve passageway and is mounted within a hollowed-out portion of the body between the two opposite passageways; the sleeve passageway aforesaid is located in the line of extension of the two opposite body passageways in the position of free diplacement of the cable; said sleeve passageway is angularly displaced with respect to the body passageways aforesaid in the cable-clamping position; the angular displacement is then such that the sleeve is partially surrounded by the winding of the cable.

As will be explained in detail hereinafter, the arrangements which have just been mentioned make it possible in the first place to prevent any metallic contact between the cable and the support, for example by forming the body and the sleeve of insulating material; passing of the cable or anchoring are ensured respectively by coincidence or relative angular displacement of the sleeve passageway and the body passageways; in the event of a break occurring in the cable on either side of the support, the sleeve which is secured to the hook is placed automatically in the clamping position, thus immobilizing the cable within the device. Finally, the winding of the cable around the sleeve in the clamping position results in more effective clamping without causing any damage to the cable.

In a preferred embodiment of the invention, a bore provided at one end with an annular bearing is mounted within the hollowed-out portion of the body; the sleeve is formed by a cylindrical shell, one end of which is rotatably mounted within the annular bearing aforesaid; the other end of the cylindrical shell has an annular flange rotatably mounted within the bore of the body; means are provided for maintaining the sleeve axially within the body; the two opposite passageways of the body preferably form a very open obtuse angle, the vertex of which is directed downwards in the position of free suspension of the hook from the support and of free displacement of the cable.

The various arrangements mentioned above facilitate the construction and use of the device as will become clear from the following description. They also achieve enhanced efficiency of the device when clamping a cable, especially in the event of a break in this latter as has already been noted.

Further properties and advantages of the invention will be brought out by the following description of a few forms of construction which are presented below by way of non-limitative example, reference being made to the accompanying drawings, in which:

FIG. 1 is a front view in elevation showing a retaining device in accordance with the invention;

FIG. 2 is a side view of the device shown in FIG. 1;

FIG. 3 is a sectional view of the same device taken along line III—III of FIG. 1;

FIG. 4 is a perspective view showing the internal sleeve of the device;

FIG. 5 is a view of the device which is hooked onto a support in the cable-clamping position;

FIG. 6 is a transverse sectional view taken along line VI—VI of FIG. 3;

FIG. 7 is a transverse sectional view of the sleeve which has been detached from the body of the device;

FIG. 8, which is similar to FIG. 1, is a front view in elevation showing an alternative form of the device;

FIG. 9, which is similar to FIG. 3, is a sectional view of the alternative form of FIG. 8.

In the form of construction shown in FIGS. 1 to 7, the retaining device in accordance with the invention comprises a body 101 fitted with a hook 102 which is pivotally mounted on the body. As shown in FIG. 5, it is thus possible to hook the body 101 onto a fixed support 104 such as for example a metallic right-angled bracket mounted at the top of a pole (not shown), for the purpose of attaching to this latter a cable 118 such as a telephone cable for an overhead line.

The body 101 is preferably of semi-hard plastic material formed by injection molding, for example. The plastic material employed can especially be of the polyamide type or of the polycarbonate type so as to permit economical large-scale manufacture of a body having excellent resistance and good surface qualities for the displacement and clamping of the cable 118 which is mounted within two opposite passageways 111, 112 of the body.

In the form of construction shown in the drawings by way of example, the two passageways 111, 112 are slots which open laterally on one side of the body 101. The two opposite passageways 111, 112 preferably form a very open obtuse angle (as shown in FIG. 1), the vertex of which is directed downwards in the position of free suspension of the hook 102 and of free displacement of the cable 118. Two lateral lugs 116, 117 so arranged as to form vertical projections at the extremities of the passageways 111, 112 ensure retention of the cable 118 within said passageways.

A movable guiding member for the cable 118 is mounted inside the body 101. Said guiding member is capable of moving with respect to the body between a position of free displacement of the cable 118 and a position of clamping of said cable.

In accordance with the invention, the movable guiding member within the body 101 comprises a sleeve 107 which ca be made for example of the same material as the body 101. The sleeve 107 is associated with the suspension hook 102 and is provided for the cable 118 with a passageway 113 constituted by a lateral slot which is similar to the slots of the body passageways 111, 112 and is employed in conjunction with these latter as will be explained hereinafter.

In the position of free displacement of the cable 118 (shown in FIGS. 1, 2, 3), the sleeve passageway 113 is located in the line of extension of the two opposite passageways 111, 112 of the body 101. On the other hand, in the clamping position of the cable 118 (shown in FIG. 5), the passsageway 113 of the sleeve 107 is angularly displaced with respect to the body passageways 111, 112. As shown in FIG. 5, the angular displacement of the passageway 113 is such that the sleeve 107 is partially surrounded by the winding of the cable 118.

It will be readily understood that the dimensions and detail arrangements of the components mentioned in the foregoing, in particular the body passageways 111, 112 and the sleeve passageway 113, are chosen as a function of the diameter of the cable 118 in order to obtain satisfactory operation of the device. For example, it has been found that the very open obtuse angle formed by the two opposite passageways 111, 112 of the body 101 could advantageously have a value of the order of 150°.

As shown in FIGS. 3 and 4, the body 101 has a bore 108 which is provided at one end with an annular bearing 119 for the sleeve 107. Said sleeve is constituted by a cylindrical shell, one end of which is rotatably mounted with slight friction within the bearing 119. The other end of the cylindrical shell of the sleeve 107 is provided with an annular flange 120 rotatably mounted within the entrance of the bore 108, thus constituting a second bearing for the sleeve. Means are provided for maintaining the sleeve 107 axially within the body 101.

In the form of construction shown in this case by way of example (FIG. 3), the sleeve 107 which is removably mounted within the body 101 is maintained axially therein by a radial retaining lug 122 which projects from the end of the sleeve beyond the annular bearing 119 and is applied against the external face of said bearing 119. In order to permit mounting and demounting of the sleeve 107, the lug 122 can be placed in coincident relation with a transfer recess 123. Said recess is formed in the annular bearing 119 opposite to the zone normally occupied by the lug 122 for the free displacement of the cable 118 or for clamping this latter in position.

As shown in FIG. 3, an annular space for winding the cable 118 is formed between the sleeve 107 and the internal wall of the bore 108 of the body 101. Winding of the cable 118 is preferably guided by an annular groove 130 formed at the periphery of the sleeve 107 as shown in FIG. 4 and having a radial depth at least equal to the diameter of the cable. The sleeve passageway 113 communicates at both ends with the groove 130 by means of flared connecting portions (shown in FIG. 6) in order to prevent any damage to the cable 118 and to its delicate sheath in the case of a sheathed cable.

As shown in FIG. 3, the stem of the hook 102 is attached to the sleeve 107 by means of a U-shaped extension, the two arms 105, 106 of which are placed at right angles with respect to the stem which is located opposite to the body 101. The stem of the hook 102 thus forms a stop for retaining the sleeve 107 in the axial direction with respect to the body 101 in conjunction with the radial lug 122.

The two arms 105, 106 of the U-shaped extension of the hook 102 (as shown in FIGS. 1, 2, 3) are located vertically beneath the point of attachment 103 of the device to the support in the position of free displacement of the cable 118. The two arms 105, 106 are secured to the sleeve 107 within a recess of this latter in a direction parallel to its axis of rotation within the body 101 on each side of the slot constituting the sleeve passageway 113. For example (as shown in FIGS. 4 and 7), the recess of the sleeve 107 which serves to accommodate the arms of the U-shaped extension comprises a cylindrical bore 110 which has the same diameter as the free arm 106 and in which this latter can be engaged. The other arm 105 of the U-shaped extension is engaged and maintained within a slot 109 located opposite to the bore 110 with respect to the sleeve passageway 113. The arms 105, 106 can be retained in the slot 109 and the bore 110 by elasticity of the sleeve 107. Said arms can also be secured by bonding or by any other known means.

The use and operation of the device described in the foregoing will now be explained with reference to FIGS. 1 to 7.

Since the device is located in the position of free suspension with respect to a point of attachment 103 as shown in FIG. 1, a cable 118 is introduced (see FIG. 5) into the passageways 111, 112 of the body 101 and into the slot constituting the passageway 113 of the sleeve 107. The introduction of the cable 118 is carried out laterally by passing the cable over the retaining lugs 116, 117. When so required, the cable which is suspended from the support 104 (shown in FIG. 5) can thus be displaced by sliding within the body passageways 111, 112 and within the sleeve passageway 113, for example if the cable is guided by hand while preventing rotation of the sleeve 107. Such an operation is useful especially at the time of installation of an electrical transmission or telephone line for adjusting the tension of the cable 118 between two adjacent supports, for example between two poles located at a distance of about thirty meters from each other.

For example, as a result of a break in the cable 118 between two supports such as 104, one of the two portions of the cable 118 which are adjacent to the body 101 may be subjected to traction in a dissymmetrical manner (arrow F). The body 101 then moves with respect to its initial position of equilibrium of FIG. 1. This movement causes a rotation of the hook 102 and of the sleeve 107 with respect to the body 101. This is immediately followed by clamping of the cable 118 within the device as a result of the angular displacement between the sleeve passageway 113 (FIG. 1) and the adjacent body passageways 111, 112.

The cable 118 is then wound around the sleeve 107 within the groove 130 and undergoes quadruple folding at the two extremities of the sleeve passageway 113 and at the inner extremities of the body passageways 111, 112 as shown in FIG. 5. This quadruple folding of the cable 118 is carried out to a greater or lesser extent according to the magnitude of angular displacement of the sleeve 107 and according to the value of the dissymmetrical traction applied by the cable 118 in the direction of the arrow F. The core of the cable 118 takes part mechanically in this clamping by multiple folding without producing any sliding effect or surface shearing action on the cable. This is an important advantage, in particular if the cable 118 has a delicate insulating sheath whose resistance to sliding is uncertain.

As a result of multiple folding of the core of the cable 118, the anchoring effect mentioned above can also be combined with a clamping effect in which the cable is pressed tightly against the wall of the bore 108 of the body 101 (shown in FIG. 3). For example, in order to carry out a clamping action of this type both progressively and without pinching the cable, the profile of the groove 130 (shown in FIG. 4) can be adapted to this purpose by means of two diametrically opposite ramps designed to come into action above a predetermined value of angular displcement of the sleeve passageway 113 with respect to the body passageways 111, 112 (shown in FIGS. 1 and 5). If necessary, it is thus possible to produce on the cable 118 a powerful clamping action corresponding to a high value of dissymmetrical traction in the direction of the arrow F. However and by virtue of the invention, the clamping action aforesaid is not liable to cause any damage either to the cable 118 or to the flexible and delicate insulating sheath with which many types of overhead cables are provided.

Slight friction is continuously exerted by the cable 118 on the extremities of the body passageways 111, 112 in the proximity of the retaining lugs 116, 117 in the symmetrical equilibrium position of the device (shown in FIG. 1). Thus a dissymmetrical effort of even very small magnitude in the direction of the arrow F immediately initiates the displacement of the body 101 with respect to the support 104 as well as the rotation of the hook 102 and of the sleeve 107 with respect to the body. Said body is in fact maintained in a substantially constant orientation by the cable 118 which is under tension. Clamping of the cable 118 accordingly takes place very rapidly, with the result that sliding of the cable and relief of the tension applied to this latter in the intact portion of the line are reduced to a negligible value.

It has been found that rapidity of clamping can be obtained with particularly great ease without impairing the other qualities of use and of operation of the device when the very open obtuse angle formed by the body passageways 111, 112 has a value of the order of 150° as stated earlier. When an arrangement of this type is adopted in a telephone line stretched between poles spaced at approximately 40 meters, an accidental break occurring in the line between two poles does not have any adverse consequences. In fact, the sliding of the cable within the clamping devices located on each side of the breakage zone does not exceed a few centimeters. The line therefore remains correctly tensioned and the repair can be carried out very rapidly.

A further advantage of the device in accordance with the invention lies in the fact that the cable can be mounted in a very short time without requiring any special tooling. Furthermore, since the device is composed of only three components which can readily be manufactured economically with a high degree of precision on a large scale and are very convenient to assemble, the industrial production of such components is therefore highly advantageous.

It is readily apparent that the invention is not limited to the form of construction which has just been described and that many alternative forms can accordingly be added without thereby departing from the scope of the invention.

By way of example, a simplified alternative form of construction of the retaining device aforementioned is accordingly illustrated in FIGS. 8 and 9. In this variant, the structure of the body 101 is not modified. On the other hand, the sleeve 207 is provided with an oblong recess 209 which is adapted to receive the arms 105 and 106 of the hook 102. Said arms are forcibly fitted within said recess after positioning the sleeve 207 within the body 101. If necessary, the arms 105 and 106 can be fixed within their recess 209 by bonding.

The sleeve 207 is thus retained at one end by the annular flange 220 and at the other end by the hook 102. The operation of the device is the same as in the forms of construction which have been described in the foregoing.

We claim:

1. A retaining device for an electric cable, comprising a body which has two opposite passageways for the cable and is provided with a suspension hook for the articulated attachment of the device to a fixed support, and a cable guiding member which is capable of moving with respect to the body between a position of free displacement of the cable and a cable-clamping position, said guiding member comprising a sleeve associated with the suspension hook and provided with a passageway for the cable, said sleeve being capable of rotating about an axis located transversely with respect to the sleeve passageway and being mounted within a hollowed-out portion of the body between the two opposite passageways, said sleeve passageway being located in the line of extension of the two opposite body passageways in the position of free displacement of the cable, said sleeve passageway being angularly displaced with respect to said body passageways in the cable-clamping position, said angular displacement being such that said sleeve is partially surrounded by the winding of the cable, the hollowed-out portion of the body comprising a bore having an annular bearing portion at one end thereof, the sleeve having a cylindrical shell having one end rotatably mounted within said bearing portion, an annular flange rotatably mounted within the bore of said body on the other end of said cylindrical shell, means for maintaining said sleeve axially within the hollowed-out portion of said body, said means comprising a radial lug integral with the cylindrical shell of the sleeve and applied against a lateral face of the bearing portion of the bore in the service position of the device, said face having a recess through which the lug passes, said lug coinciding with said recess in a position of introduction of the sleeve within the body, the last-named position being spaced from the position of free displacement of the cable and from the position of clamping of the cable.

2. A retaining device according to claim 1, wherein the stem of the hook has a U-shaped extension, the two parallel arms of the U being disposed vertically beneath the point of attachment to the fixed support in the position of free displacement of the cable, and wherein the two aforementioned arms are fixed parallel to the axis of the sleeve on each side of said axis within a recess of said sleeve.

3. A retaining device according to claim 2, wherein the stem of the hook is joined to its U-shaped extension by means of a right-angled connecting portion, the stem being in oppositely-facing relation to the body so as to form an axial retaining stop for maintaining the sleeve within the hollowed-out portion of said body.

4. A retaining device according to claim 3, wherein the recess provided in the sleeve for the two arms of the U comprises a cylindrical bore for engaging one arm therein and a groove provided for the other arm and located on the side opposite to the bore with respect to the cable passageway formed in said sleeve.

5. A retaining device according to claim 4, wherein the arms of the U are fixed by bonding their recesses in the sleeve.

* * * * *